(No Model.) 7 Sheets—Sheet 4.
W. B. DODDRIDGE.
RAILROAD DITCHER.
No. 549,188. Patented Nov. 5, 1895.
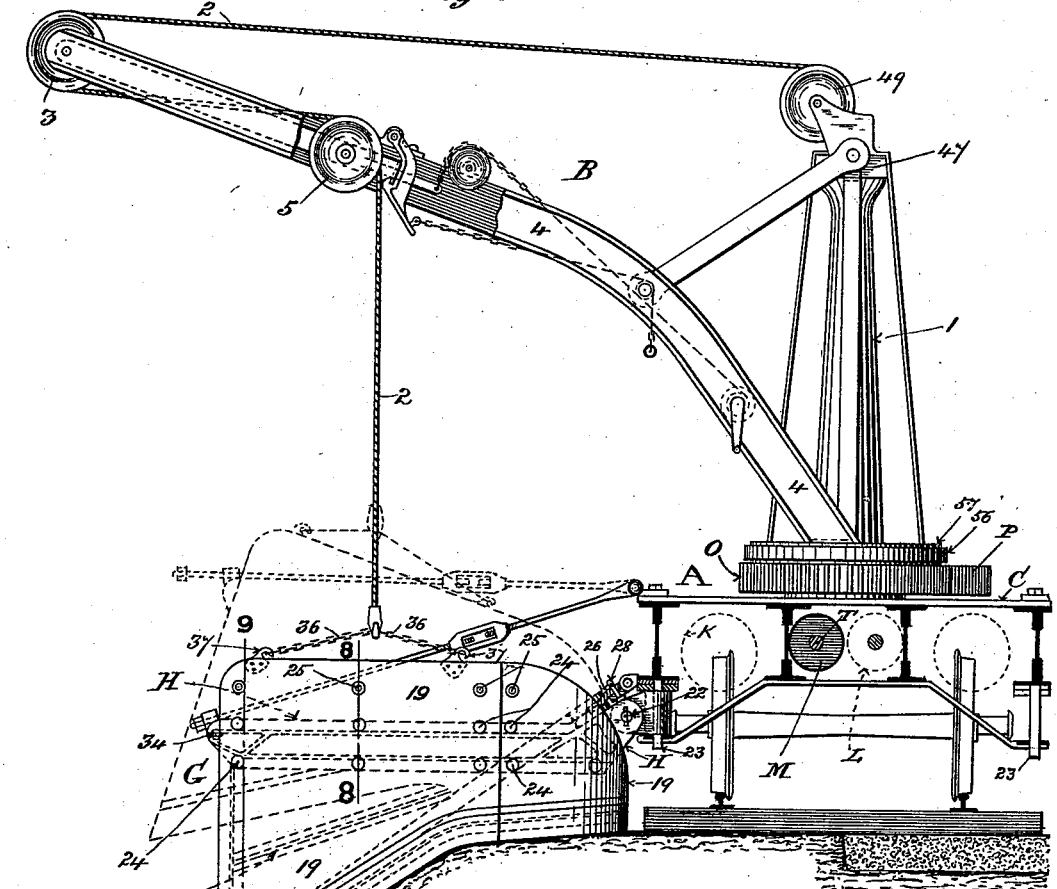
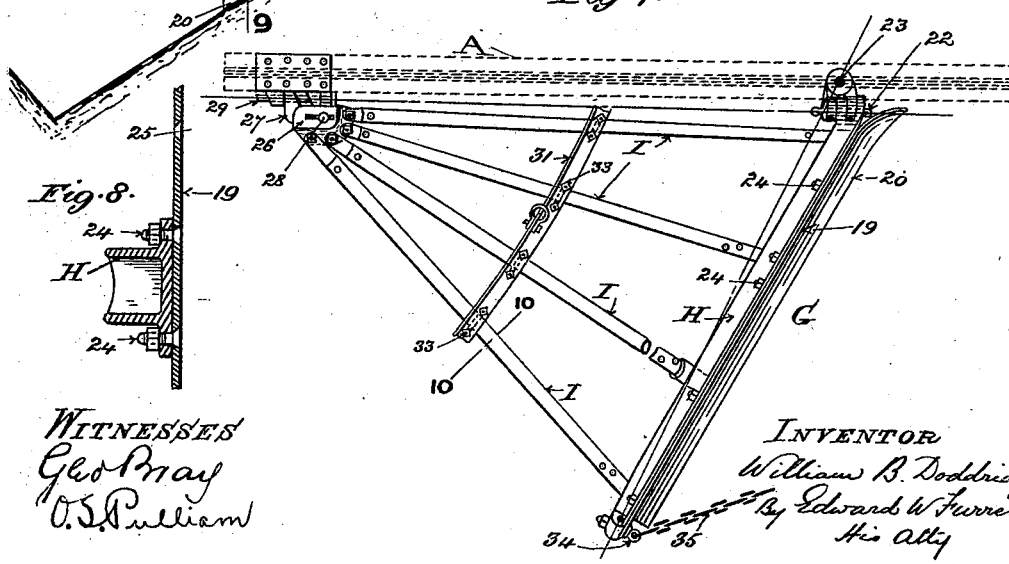

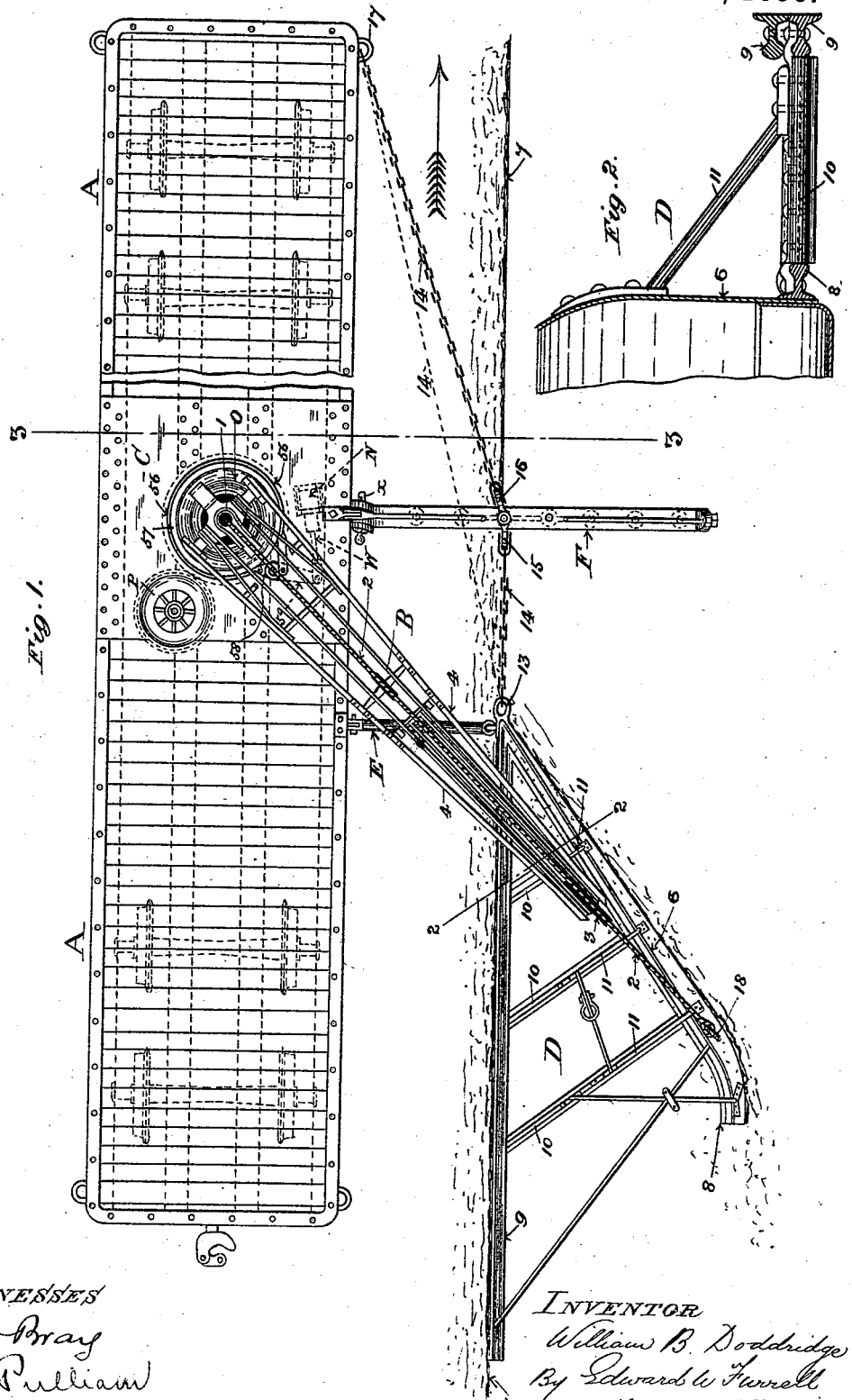

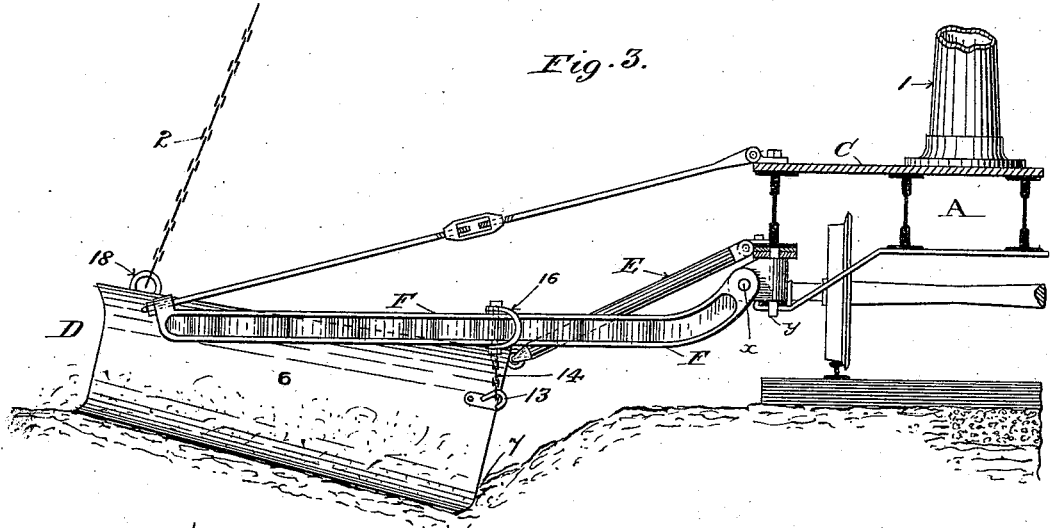
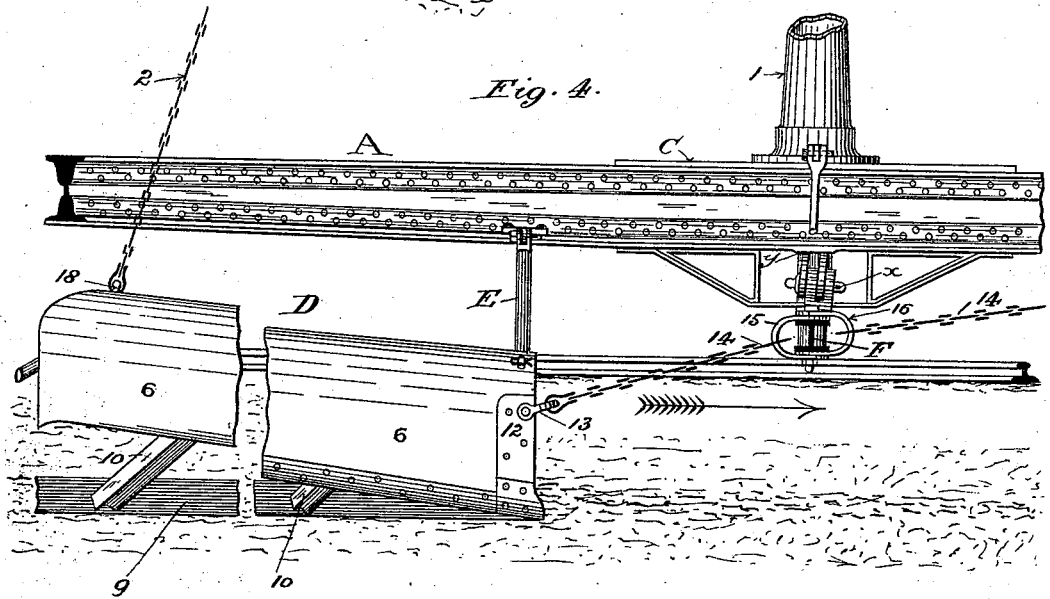

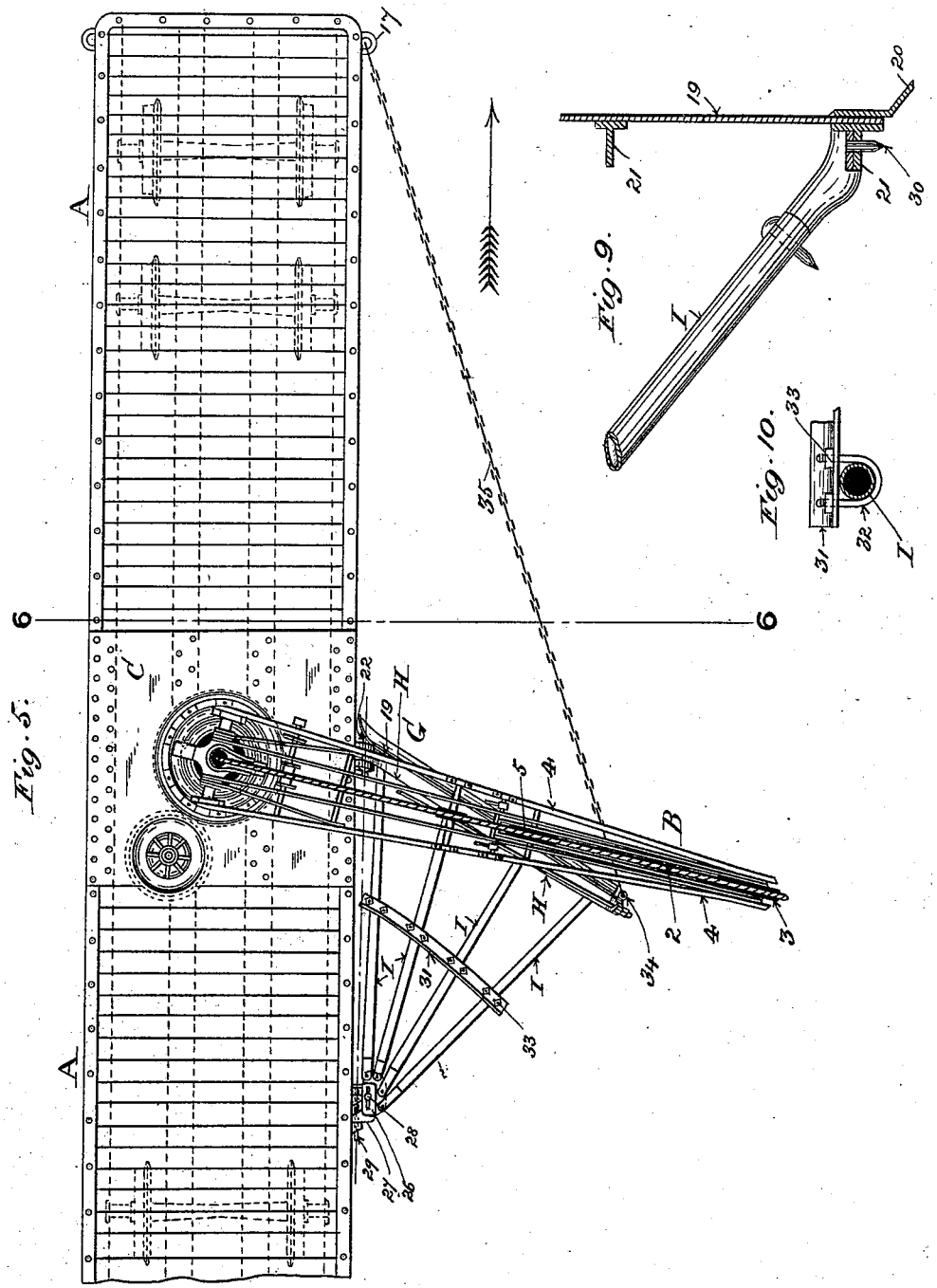

(No Model.) 7 Sheets—Sheet 5.
W. B. DODDRIDGE.
RAILROAD DITCHER.
No. 549,188. Patented Nov. 5, 1895.
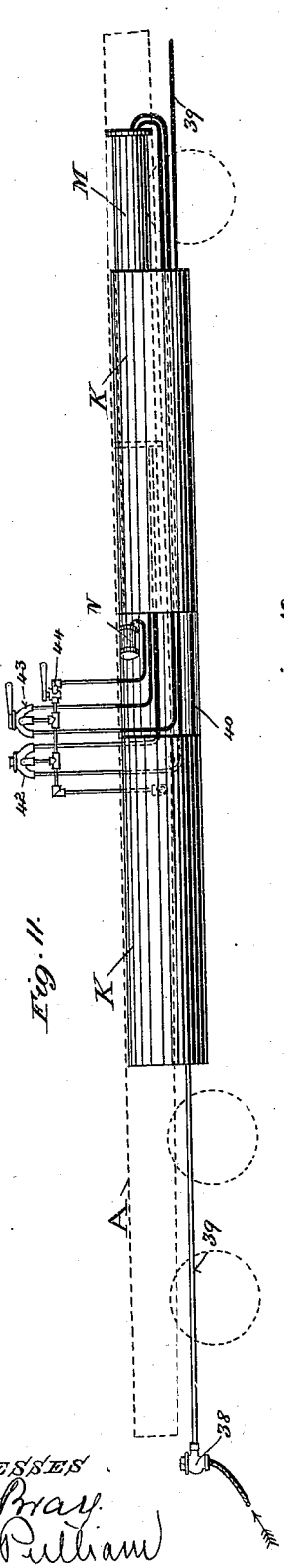
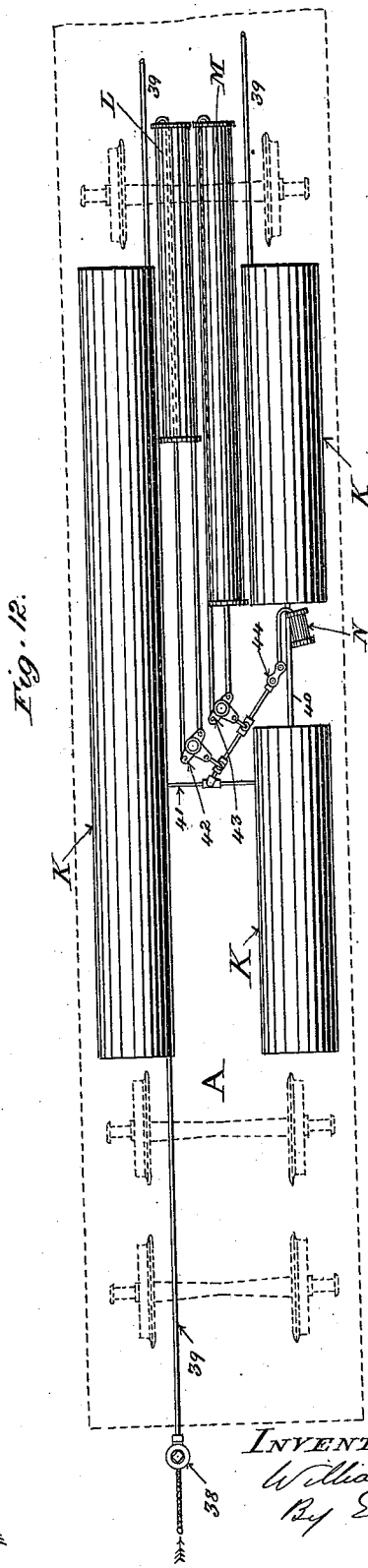
WITNESSES
Geo Pray
O. S. Pulliam
INVENTOR
William B. Doddridge
By Edward W. Furrell
His Atty (No Model.)　　　W. B. DODDRIDGE.　　　7 Sheets—Sheet 6.
RAILROAD DITCHER.

No. 549,188.　　　Patented Nov. 5, 1895.

WITNESSES
Geo Bray
O. S. Pulliam

INVENTOR
William B. Doddridge
By Edward W. Turrell
His Atty

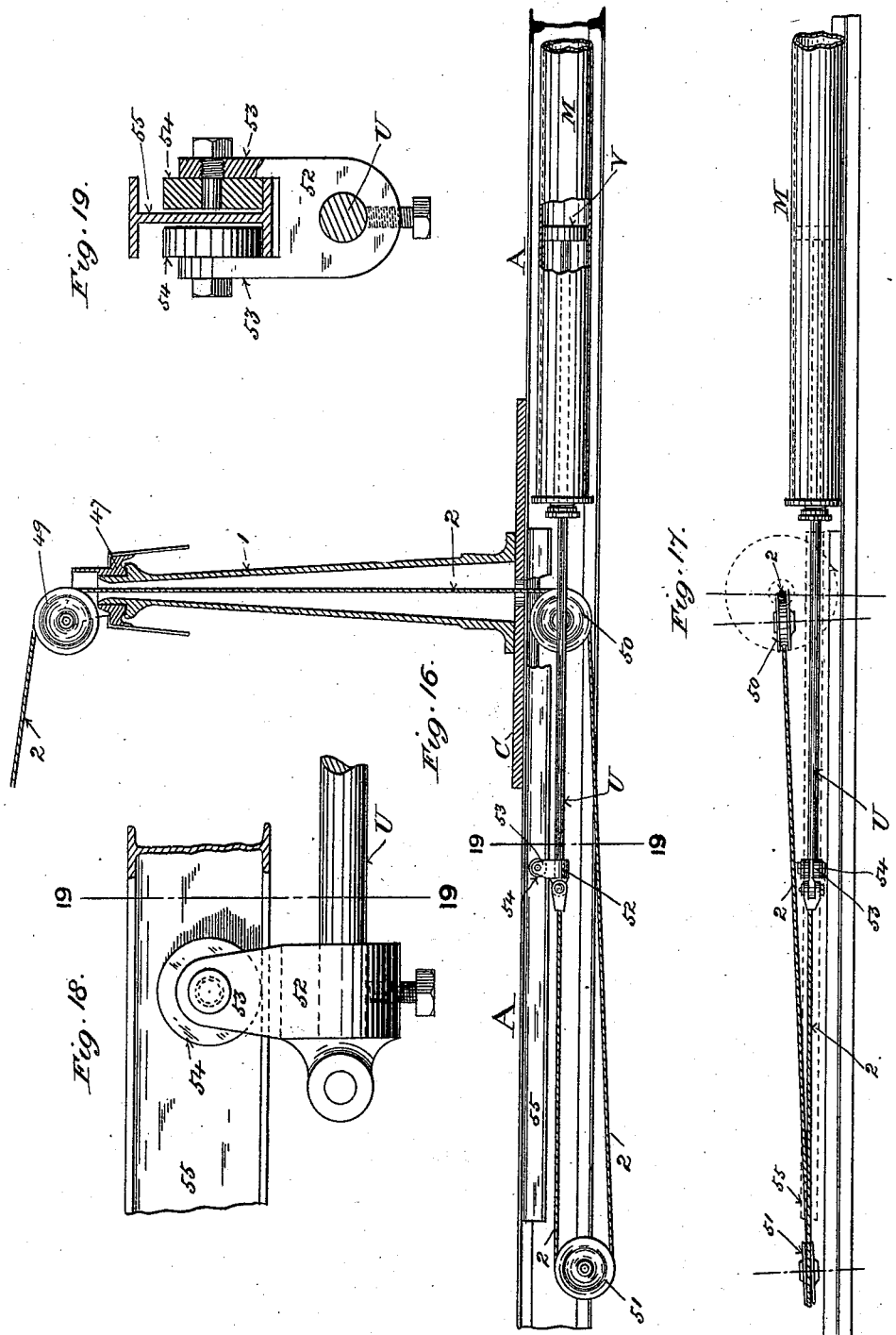

UNITED STATES PATENT OFFICE.

WILLIAM B. DODDRIDGE, OF ST. LOUIS, MISSOURI.

RAILROAD-DITCHER.

SPECIFICATION forming part of Letters Patent No. 549,188, dated November 5, 1895.

Application filed August 16, 1895. Serial No. 559,519. (No model.)

*To all whom it may concern:*

Be it known that I, WILLIAM B. DODDRIDGE, a citizen of the United States, residing at St. Louis, in the State of Missouri, have invented a new and useful Improvement in Railroad-Ditchers, of which the following is a specification.

This invention relates to apparatus used in connection with a railroad-car for ditching and forming the earth-bed embankments at the sides of the track, and has for its object to improve the construction and means of holding and adjusting the various implements used, as hereinafter particularly described and claimed, reference being had to the accompanying drawings, forming part of this specification, whereon—

Figure 13:
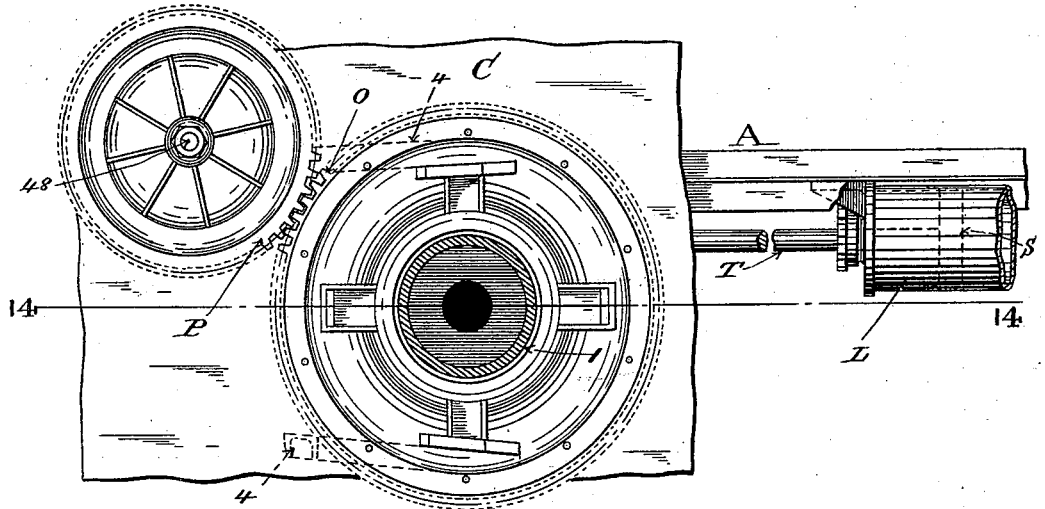
Figure 14:
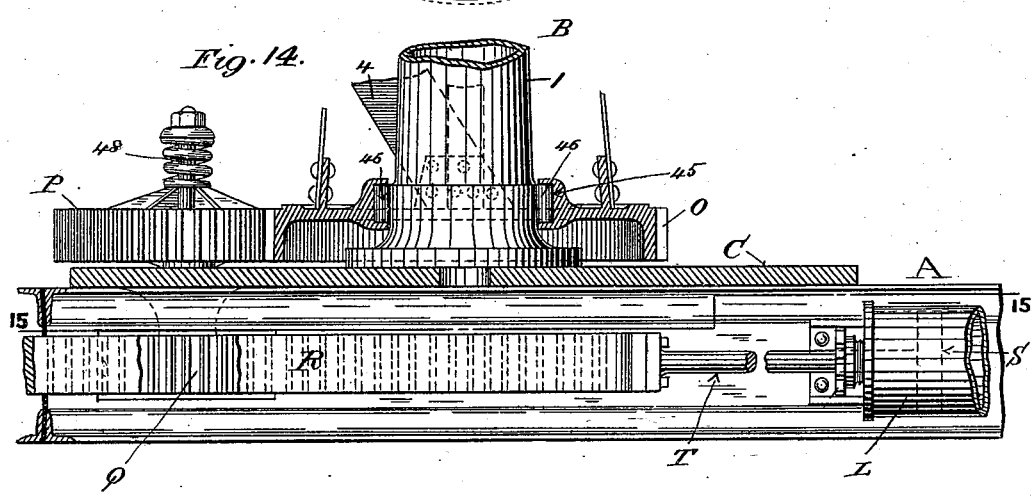

Figure 1 is a plan view of a railroad flat car (broken away) having a scraper and its controlling devices forming parts of my invention applied thereto; Fig. 2, a cross-section to enlarged scale through the scraper, taken on line 2 2 in Fig. 1; Fig. 3, a transverse section to enlarged scale through the car (broken away) on line 3 3 in Fig. 1, showing the scraper in front elevation; Fig. 4, a side view thereof; Fig. 5, a plan view of the car, having a shoulder-former or earth-work-templet with its supporting and controlling appliances in lieu of the scraper; Fig. 6, a transverse section to enlarged scale through the car, taken on line 6 6 in Fig. 5, showing the shoulder-former in front elevation; Fig. 7, a plan of the shoulder-former detached, with its supporting-boom and bracing; Fig. 8, a cross-section to enlarged scale through the upper part of the shoulder-former and its supporting-boom, taken on line 8 8 in Fig. 6; Fig. 9, a similar view through the lower part of the shoulder-former, on line 9 9 in Fig. 6, showing one of the braces connected thereto. Fig. 10 is a cross-section through one of the braces on line 10 10 in Fig. 7. Fig. 11 is a diagrammatic side view of the car, (indicated by broken lines,) showing the general arrangement of the compressed-air reservoirs, motion-cylinders, valves, and connections for operating the crane carried by the car for controlling the scraper and shoulder-former; Fig. 12, a plan of the same. Fig. 13 is a plan view to enlarged scale of the swinging gear for the crane; Fig. 14, a vertical section thereof, taken on line 14 14 in Fig. 13; and Fig. 15, a horizontal section taken on line 15 15 in Fig. 14. Fig. 16 is a vertical section through the crane-post and base-plate on the car, showing the hoisting mechanism of the crane; and Fig. 17 a plan thereof omitting the crane-post and top sheave. Fig. 18 is a detached side view to enlarged scale of the piston-rod guide seen in Figs. 16 and 17; and Fig. 19 a cross-section thereof on line 19 19 in Figs. 16 and 18, like letters and numerals of reference denoting like parts in all the figures.

A represents a railroad flat car which is mounted on the ordinary trucks and wheels, and may be of any suitable construction, but preferably similar to the railroad plow-car described in my application for Letters Patent for an improvement in railroad plow-cars, filed April 1, 1895, Serial No. 544,031.

On the car A is mounted a crane B, having its pillar 1 fixed at the base to the deck-plate C. The crane B may be of any suitable construction adapted to swing around its pillar 1 in either direction. The hoisting-cable 2 of the crane B may either pass over and depend directly from the sheave 3 at the outer end of the jib 4 in the usual manner, or be directed from the sheave 3 along the jib 4 toward the pillar 1 and over an auxiliary sheave 5 from which it depends, as shown particularly in Fig. 6.

D represents a scraper (see particularly Figs. 1, 2, 3 and 4) which is used in connection with the car A for removing the earth which has been previously broken up at the side of the track by the plow, such as that described in my said application. The scraper D consists, preferably, of a sheet-metal plate 6, which is arranged in a vertical plane inclined from the nose of the scraper D outward from the shoulder 7 of the furrow formed by the plow. The plate 6 is riveted at its lower edge, which is dished outward and inclined upward from the nose of the scraper to a preferably T-shaped bar 8, which forms one side or leg of a horizontally-arranged wedge-shaped frame, the other side or leg whereof is composed, preferably, of two T-shaped bars 9, placed one above the other and secured together by rivets with their flanges flush with each other externally for bearing against the shoulder 7 of the plowed furrow. The bars 8 9 are braced together by similar bars 10, and these by inclined stays 11 to the upper part of the plate 6, which is preferably curved outward for its entire length. At the nose of the scraper D are reinforcing plates or forgings 12, which are riveted to the plate 6 and bars 9 for strengthening the scraper D thereat.

The scraper D is held at the required distance from the car A, according to that of the shoulder 7 of the plow-furrow, by a distance-bar E, which is removably connected at one end to the side of the car A and at its other end to the nose of the scraper D, or thereabouts.

I do not limit myself to the particular construction of the scraper D nor to that of the bar E, as these may be varied in practice according to requirement.

To the nose of the scraper D is coupled a clevis 13, from which the traction-chain 14 extends, preferably, to a clevis 15, held by a boom F, which projects horizontally from the side of the car A, and is secured at one end thereto, preferably by a double hinge-joint $x$ $y$, (see particularly Figs. 3 and 4) whereby the boom F can be swung in a horizontal or vertical plane, as required. Coupled to the boom F, conjointly with the clevis 15, is a clevis 16, from which the traction-chain 14 extends to the clevis 17, coupled to the forward end of the car A, whereby, on the forward movement of the car A, the scraper D is operated and removes the earth from the plowed furrow outward or away from the track; or in lieu of removing the earth outward from the track the scraper D may be reversed or arranged with its plate 6 inclined toward the car A, in which case the earth will be thrown inward or toward the track.

If desired, the boom F may be dispensed with and the traction-chain 14 passed directly from the scraper D to the clevis 17 at the forward end of the car A, as indicated by broken lines in Fig. 1.

For regulating the height of the rear end of the scraper D the free end of the crane-cable 2 is hitched to a clevis 18, which is held by the plate 6.

For forming the upper portion or shoulder of the road-bed embankment at the side of the track, after the disposal of the earth by the scraper D, a shoulder-former or earth-work-templet G, Figs. 5 to 10, is used in lieu of the scraper D. The shoulder-former G is composed, preferably, of a sheet-metal plate 19, arranged in a vertical plane at the side of the car A, and beveled or dished forwardly at its lower edge 20, Fig. 9, which conforms longitudinally in shape to the finished profile of the embankment. The plate 19 is stiffened on its rear side by T-irons 21, Figs. 6 and 9, or otherwise, as found most suitable. The shoulder-former G is secured to a boom H, which projects from the side of the car A and is secured thereto at one end, preferably by the double hinges 22 23, in a similar manner to the boom F, previously described, whereby in case of a sudden obstruction to the forward movement of the shoulder-former G the boom H will yield horizontally or may be raised vertically for passing over obstructions, as indicated by broken lines in Fig. 6.

The shoulder-former G is secured to the boom H by bolts 24, which pass through holes in the plate 19 and through corresponding holes in the boom H, Fig. 8, the heads of the bolts 24 being countersunk and flush with the front of the plate 19.

For adjusting the shoulder-former G, as the work proceeds, the bolts 24 are removed and the plate 19 lowered for bringing the upper countersunk holes 25, Fig. 6, opposite to the corresponding upper holes in the boom H' when the bolts 24 are replaced and the shoulder-former G thereby secured in position for completing the work.

The rear bracing of the shoulder-former G consists, preferably, of a series of tubular stays I, which radiate from and are jointed at one end to a block 26, secured to a second block 27 by a pin 28, which is of sufficient strength to resist the ordinary pressure thereon by the shoulder-former G, but will yield or break under sudden or undue strain, and thereby release the block 26, bracing I, and shoulder-former G and permit these parts to give way without fracture.

The block 27 is hinged to the side of the car A by a pin 29, which is in axial alignment with the hinge 22 of the boom H, whereby the block 26 and bracing I may be raised conjointly and conformably with the boom H and shoulder-former G. The other ends of the braces I are formed or provided with downwardly-projecting bolts or pins 30, Fig. 9, which pass through corresponding holes in the lower T-iron stiffener 21 of the plate 19, the ends and adjacent shoulders of the braces I abutting against the front flange and rear edge, respectively, of the stiffener 21, as shown.

The stays I are braced together horizontally by an angle-iron 31, which is clamped to the braces I, respectively, by a stirrup-iron 32, Fig. 10, which embraces the stay I and passes on each side thereof through the flange of the angle-iron 31, where its screwed ends are clinched by nuts 33.

To the outer end of the boom H is attached a clevis 34, from which the traction-chain 35 passes to and connects with the clevis 17 at the forward end of the car A, as in the case of the scraper D before described, or the chain 35 may connect directly to the shoulder-former G.

I do not limit myself to the particular construction of bracing herein described for the shoulder-former G, as other means for transmitting the thrust of the plate 19 to the car A may be employed.

For holding and regulating the position of the shoulder-former G and for raising the same when required, the cable 2 of the crane B is hitched at its free end, preferably to a chain 36, Fig. 6, which is coupled at the ends to hooks or staples 37, fixed to the upper portion of the shoulder-former G, or the cable 2 may be coupled to the shoulder-former G in any other convenient manner.

For operating the crane B, I preferably use compressed air, (as described in my said application,) which may be supplied by the locomotive-engine hauling the car A, or otherwise, through the inlet-valve 38 and feed-pipes 39, Figs. 11 and 12, to auxiliary air-reservoirs K, which are carried by the car A beneath the platform or in any other convenient position and communicate with each other by means of pipes 40 41. The pipe 41 communicates with the supply and exhaust cocks or valves 42 43 44, which are of well-known construction and control the admission and exhaustion of the compressed air to and from the swing-motion cylinder L, the lift-motion cylinder M, and the brake-cylinder N of the crane B, respectively.

Figure 15:
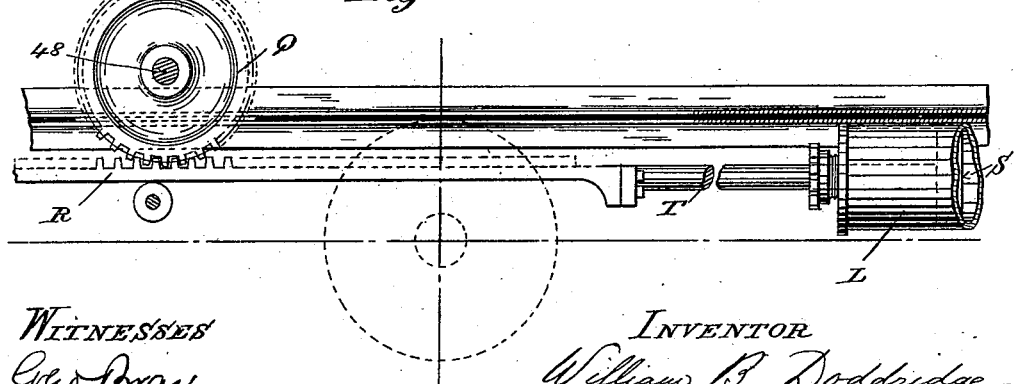

The swing-gear of the crane B, Figs. 13, 14, and 15, consists, preferably, of a horizontal spur-wheel O, which surrounds the crane-pillar 1, contiguous to the deck-plate C of the car A. Between the circumference of the pillar 1 and the concentric wall of the recessed opening 45 therefor in the wheel O are vertically-arranged friction-rollers 46. To the upper side of the wheel O is secured the base of the jib 4 and other framework of the crane B, the said framework being fixed at the top to a cap 47, Fig. 6, which is journaled on and supported by the top of the pillar 1, around which the entire structure is adapted to swing in either direction. The spur-wheel O is engaged by a spur-wheel P, which is frictionally held on an upright shaft 48, having its bearing in the deck-plate C and projecting below the latter. On the lower end of the shaft 48 is fixed a spur-pinion Q, which is engaged by a toothed rack R, arranged and adapted to reciprocate longitudinally beneath the platform of the car A. Within the swing-motion cylinder L is a piston S, having the rod T, which passes through a stuffing-box in the head of the cylinder L and is attached at its outer end to one end of the toothed rack R, whereby on admitting compressed air to either side of the piston S the rack R will swing the crane B in either direction, as required.

For hoisting and lowering by the crane B, the cable 2 passes from the outer sheave 3 over a sheave 49, Figs. 16 and 17, which is axially mounted immediately over the top of the pillar 1, through the interior of which the cable 2 descends and passes under a sheave 50, axially mounted below the deck-plate C. From the sheave 50 the cable 2 passes under and over a sheave 51, arranged at a suitable distance from the sheave 50, and thence returning the end of the cable 2 is connected to the outer end of the piston-rod U, which is attached to the piston V within the lift-motion cylinder M, so that on admitting compressed air to either side of the piston V the free end of the cable 2 is raised or lowered by the rod U at pleasure.

The piston-rod U is guided by a block 52, which is fixed to the rod U adjacent to the coupled end of the cable 2, and formed with a projecting jaw 53, carrying on each inside face a roller 54, the two rollers 54 riding upon the lower flanges, respectively, of an I-beam 55, which is fixed longitudinally in the path of the rod U to the under side of the platform or adjacent framing of the car A.

The brake motion of the crane B, Fig. 1, consists, preferably, of a brake-band 56, which encircles a pulley-wheel 57, fixed on the upper side of the spur-wheel O of the swing motion. The band 56 is closed upon or loosened from the periphery of the wheel 57 by levers 58 59, the lever 59 being jointed at its outer end to the piston-rod W of the brake-cylinder N, the piston of which is operated by compressed air controlled by the valve 44, Figs. 11 and 12, in a similar manner to the swing and lift motions; or the brake-band 56 may be applied to the wheel 57 by foot or hand in lieu of compressed air.

I do not limit myself to the use of compressed air, nor to the particular arrangement of mechanism described for operating the crane B, as steam, water, or other motive power may be used therefor, and the means for transmitting the power modified according to circumstances.

What I claim as my invention, and desire to secure by Letters Patent, is—

1. In a railroad ditcher, the combination of a railroad car, a scraper having its frame or carrier apart from the car, one side of the said frame opposite to the scraper bearing against the plowed furrow, a chain connecting the scraper to the car, a crane, and means for operating the crane, substantially as described.

2. In a railroad ditcher, the combination of a railroad car, a shoulder former having stiffening braces, a boom projecting from, and hinged to the car, the said former being fixed to the boom, and a traction chain connecting the boom to the car, the said braces being hinged to the car alignably with the boom hinge, substantially as described.

3. In a railroad ditcher, the combination of a railroad car, a shoulder former having stiffening braces, a boom projecting from, and hinged to the car, the said former being fixed to the boom, a traction chain connecting the boom to the car, a crane, and means for operating the crane, the said braces being hinged to the car alignably with the boom hinge, substantially as described.

WILLIAM B. DODDRIDGE.

Witnesses:
F. W. IRLAND,
EDWARD F. GALTON.